United States Patent [19]
Burke et al.

[11] Patent Number: 5,706,347
[45] Date of Patent: Jan. 6, 1998

[54] METHOD AND SYSTEM FOR AUTHENTICATING A COMPUTER NETWORK NODE

[75] Inventors: Andrew Stephen Burke; Dale Carl Gugliotta, both of Raleigh, N.C.

[73] Assignee: International Business Machines Corporation, Armonk, N.Y.

[21] Appl. No.: 552,893

[22] Filed: Nov. 3, 1995

[51] Int. Cl.$^6$ ............................. H04L 9/32; H04L 9/00
[52] U.S. Cl. ............................. 380/21; 380/23; 380/25; 380/49
[58] Field of Search ............................. 380/9, 21, 23, 380/25, 29, 37, 43, 49

[56] References Cited

U.S. PATENT DOCUMENTS

| | | |
|---|---|---|
| 4,193,131 | 3/1980 | Lennon et al. . |
| 4,227,253 | 10/1980 | Ehrsam et al. . |
| 4,500,750 | 2/1985 | Elander et al. . |
| 4,649,233 | 3/1987 | Bass et al. ............................. 380/21 |

*Primary Examiner*—Bernarr E. Gregory
*Attorney, Agent, or Firm*—John J. Timar

[57] ABSTRACT

A method and system for verifying the identity of a computer network node is provided. As part of the session initiation process between two partner nodes planning to exchange sensitive encrypted data, the node receiving data generates and encrypts a session key which is transmitted to the node sending data. At the sending node, the low order four bytes of the encrypted session key are saved for authentication of the receiving node. The encrypted session key is returned to the receiving node as session set-up continues. The receiving node concatenates the low order four bytes of the encrypted session key with four bytes of pseudorandom data to form an initial chaining value which is then encrypted and transmitted to the sending node. The sending node recovers the initial chaining value and compares the low order four bytes of this value with the low order four bytes of the encrypted session key previously saved. If the values are the same, authentication of the receiving node is established.

13 Claims, 3 Drawing Sheets eKMT(KS) = Session key enciphered under SLU master key
eKCD(KS) = Session key enciphered under cross-domain key
eKS(ICV) = Initial Chaining Value enciphered under the session key
eKS(ICV') = A variant of the Initial Chaining Value enciphered under the session key

METHOD AND SYSTEM FOR AUTHENTICATING A COMPUTER NETWORK NODE

BACKGROUND OF THE INVENTION

This invention relates to data security techniques and more particularly, to a process for authenticating or verifying the identity of a computer network node receiving sensitive data.

A data communication network may include a complex of communication terminals connected via communication lines to a single host system and its associated resources such as the host programs and locally attached terminals and data files. Within the data communication network, the domain of the host system is considered to be the set of resources known to and managed by the host system. As the size of data communication networks increases, other host systems can be added to provide multiple domain networks with each host system having knowledge of and managing its associated resources which make up a portion or domain of the network. By providing the proper cross domain data link between the domains of the network, two or more domains may be interconnected to provide a networking facility.

The data communication network can be defined generally as a collection of network nodes and end nodes interconnected through communication links or transmission groups. An end user's interface to the data communication network is referred to as a logical unit. A logical unit is a device or program that enables access to the data communication network. Two end users communicate over a logical connection called a session. The logical unit establishing the session is referred to as the primary logical unit (PLU); the other logical unit is referred to as the secondary logical unit (SLU). Each end node and network node contains a control point (CP) that provides control functions such as session initiation and termination. Control points communicate with each other via CP-CP sessions. The domain of each network consists of the logical units, physical units, and control points under its control. To initiate a session with a logical unit in the domain of another network node, a logical unit must first send a session initiation request to the control point in its serving network node requesting that a particular session be established. The control point in the serving network node forwards the cross-domain session initiation request along with a directed search message to the destination network node believed to contain the target logical unit.

Various cryptographic algorithms have been developed in the prior art for improving data security in data processing and data communication systems. One such widely used algorithm, described in U.S. Pat. No. 3,958,081 was adopted by the National Bureau of Standards as a data encryption standard (DES) algorithm. Various forms of cryptographic apparatus are available for carrying out encrypting and decrypting operations in accordance with the DES algorithm. One such apparatus is described in U.S. Pat. No. 4,238,853. Cryptographic apparatus is provided at the host systems and at various remote terminals in order to perform cryptographic communication. The sending and receiving stations must use the same cryptographic algorithm and a common operational key so that the data encrypted by the sending station can be decrypted at the receiving station. An unauthorized receiver of encrypted data would be unable to decrypt the data unless a brute force method was applied, i.e., all possible combinations of a session key would have to be tried and the results examined to determine whether the data was decrypted correctly. In general, data encrypted under the DES algorithm cannot be decrypted on a practical basis by a brute force method, since it would be too expensive and time-consuming. Thus, while the encrypted data is secure, it is still subject to being lost or misdirected.

In certain industries like the banking industry, a problem can arise in the transfer of data from one network node to another network node. For example, in the transfer of a money voucher from a Federal Reserve bank to another bank, once the voucher is transferred, it is deleted at the sending node. This is done in cases where two copies of the data are interpreted as two separate entities, rather than as one entity with a copy. If the voucher is sent to the wrong node, the sending node will delete its copy of the voucher leaving no record of the voucher, causing a loss of data.

The problem is actually one of improper authentication of the receiving node by the sending node prior to the sending of the voucher. It is possible to completely avoid this problem with the use of known authentication procedures. However, to do so at one node would force the owners of all other nodes to upgrade their hardware and software to remain compatible. This is impractical and generally unacceptable in the banking industry, because the industry is heavily invested in existing hardware and software equipment that would be rendered obsolete.

SUMMARY OF THE INVENTION

It is thus an object of this invention to provide a method and system for authenticating a receiving node in a data communication network.

It is a further object of this invention to provide a method and system for preventing loss of sensitive data caused by sending the data to a receiving node that does not possess the proper key for decrypting the data.

It is yet another object of this invention to provide a method and system for authenticating a network node that does not alter the format of the cryptographic data that flows across the data communication network between partner nodes.

These and other objects and advantages are accomplished by the present method and system in which two communicating nodes in a data communications network share a common operational (session) key. In responding to a session initiation request, the receiving node generates a session key and encrypts it with its own master key. The encrypted value is sent to the sending node which decrypts it to obtain the session key. The sending node saves a selected portion of the encrypted session key received from the other node. The sending node then sends a session set-up request to the receiving node containing the encrypted session key. The receiving node decrypts the session key using its own master key. The receiving node then selects a portion of the encrypted version of the session key sent by the sending node and appends this selected portion to a random number to form a vector of the same size as used in existing systems. This vector is encrypted using the session key to form another vector which is returned to the sending node. The sending node decrypts this latter vector with the session key to obtain the original vector generated by the receiving node. The sending node next compares the selected portion of the encrypted session key with the original value sent by the receiving node to verify that the receiving node is in possession of the session key and is thus the intended receiving node. The entire vector returned to the sending node is subsequently used as in existing systems to allow the receiving node to authenticate the sending node. If the selected portion of the encrypted session key is not recovered at the sending node from the vector sent by the receiving node, an election is made as to whether to abort the entire transaction or to complete the transaction and take the chance of losing the transaction to an unintended receiving node.

The foregoing and other objects, features and advantages of the invention will be better understood by reference to the following detailed description of a preferred embodiment as illustrated in the accompanying drawings.

DETAILED DESCRIPTION OF THE PREFERRED EMBODIMENT

The invention is an improved method and system for authenticating receiving nodes in a data communication network. The use of the invention is not restricted to any specific type of computer network, however, it will be described in an environment that uses the IBM SNA architecture.

Figure 1:
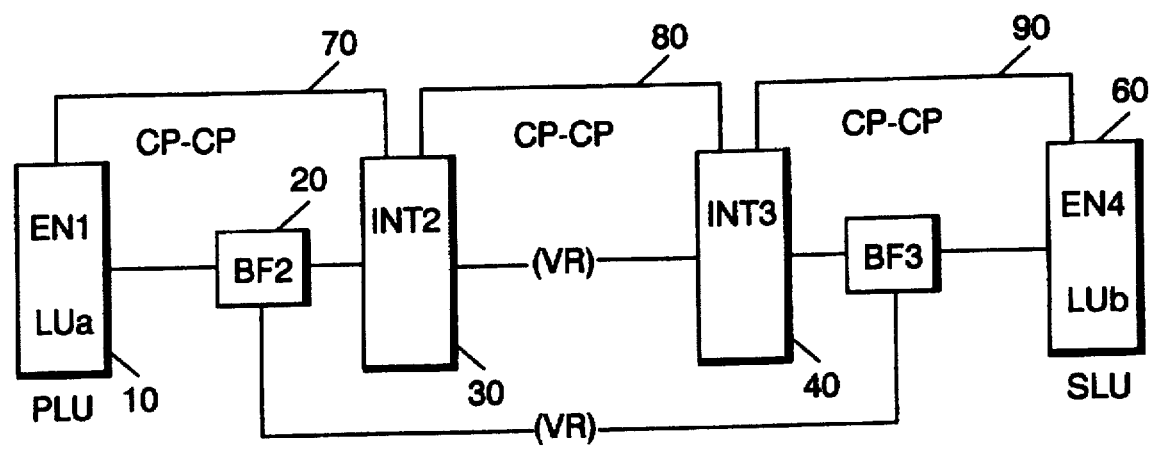
FIG. 1 illustrates a representative data communications network in which the present invention may be implemented.

FIG. 1 shows a portion of a representative data communication network in which the present invention can be implemented. The end nodes EN1 and EN4 are designated by reference numerals 10 and 60, respectively. EN1 is linked to EN4 over a communication path that includes intermediate network nodes INT2 and INT3, designated by reference numerals 30 and 40, respectively. Each node depicted in FIG. 1 is an independent data processing system. In particular, end nodes 10 and 60 can be host computer systems, such as the IBM System/370 or System/390 processors supported by IBM Multiple Virtual Storage (MVS) operating system.

All nodes communicate through control point to control point (CP-CP) sessions, such as CP-CP sessions 70, 80 and 90 in FIG. 1. A network node (including the end nodes) in actuality has two CP-CP sessions with each physically adjacent network node, although only one such connection is shown between each pair of network nodes in FIG. 1 to simplify the representation. Each session can be characterized as a one-way pipe over which transactions flow in one direction. Each of the nodes in the computer network can support one or more logical units which enable logical connections between nodes. A more detailed description relative to session establishment can be found in "IBM Systems Network Architecture Format & Protocol Reference Manual: Architecture Logic (SC30-3112), which is hereby incorporated by reference.

Figure 2:
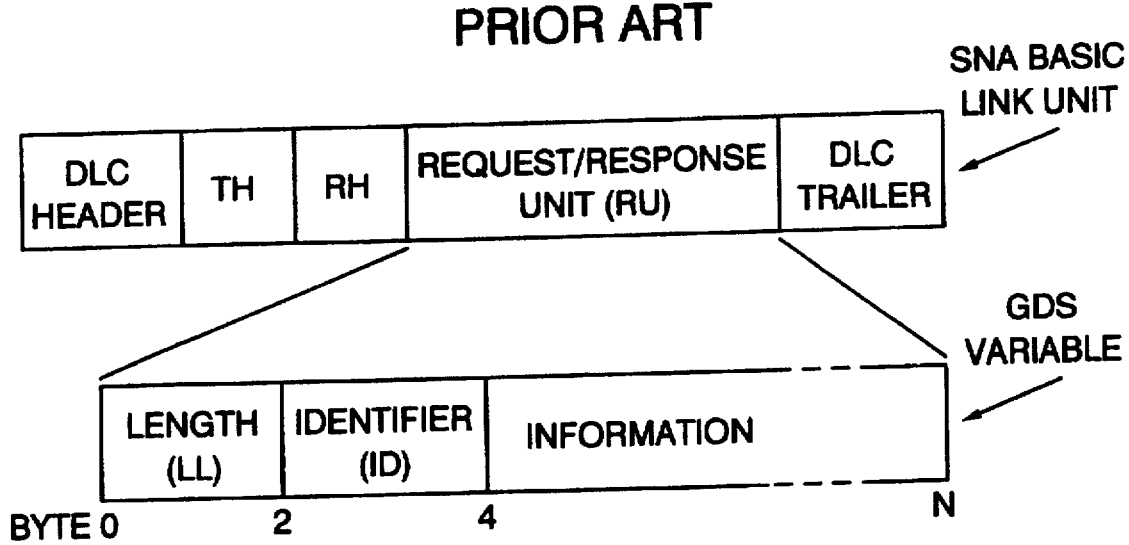
FIG. 2 illustrates the standard format for the SNA basic link unit and the standard format for a general data stream (GDS) variable in SNA.
Figure 3:
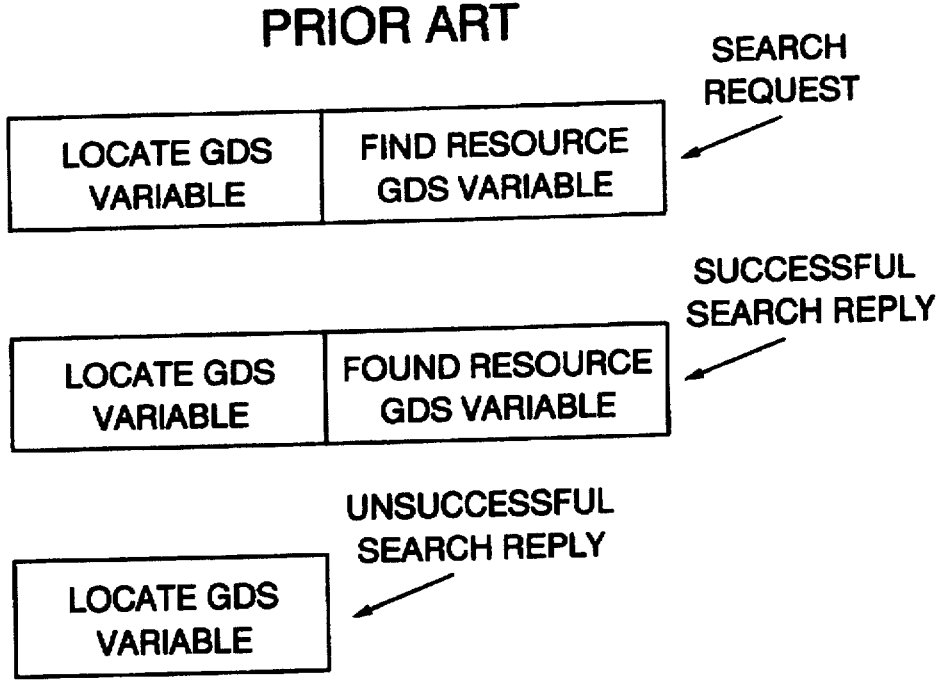
FIG. 3 illustrates the prior art formats for a search request and for search replies that are used in the context of the present invention.

The format of the SNA basic link unit (BLU) and of a general data stream (GDS) variable is illustrated in FIG. 2. The BLU contains a data link control (DLC) header, a transmission header (TH), a request/response header (RH), a request/response unit (RU) field of variable length and a DLC trailer. The RU field contains one or more GDS variables, with each GDS variable having a header combining length (LL) and identifier (ID) fields and followed by data or information. The messages that are exchanged between nodes in an SNA-based network utilize the BLU format.

The LOCATE message is the flow that nodes exchange in an effort to locate a destination resource. LOCATE is a shorthand term for an SNA message that contains either a LOCATE GDS variable and FIND RESOURCE GDS variable for a search request or a LOCATE GDS variable and FOUND RESOURCE GDS variable for a search reply when the resource (i.e., logical unit) has been located. The general format of LOCATE messages and the methods for locating resources (i.e., logical units) in a data communications network are described in U.S. Pat. No. 4,914,571, which is incorporated herein by reference.

Once the destination logical unit is located, the originating logical unit activates the session by transmitting a set-up message, called a BIND, over the path that the session is to follow. For sessions that use cryptography, the cryptography options are specified in the BIND request message at offsets 26 and 27. The specified options are either X'1900' or X'3900' for normal SNA logical unit initiated sessions, depending on whether the encryption is applied to all data, or only to data that is indicated as being encrypted in the corresponding request header. The encrypted session key is included in the BIND request at offsets 28 through 35. When the BIND message arrives at the destination logical unit, certain parameters are negotiated between the logical units, and then the destination logical unit sends a BIND RESPONSE message to the originating logical unit. The cryptography options from the BIND request are copied into the BIND response at offsets 26 and 27. In the BIND response, an initial chaining value encrypted under the session key is included at offsets 28 through 35. In the following description, the logical unit transmitting the BIND message is referred to as the primary logical unit (PLU), and the logical unit receiving the BIND message is referred to as the secondary logical unit (SLU).

In data communication networks using cryptographic facilities, there are two categories of cryptographic keys used. Data encrypting or operational keys are used to encrypt/decrypt data while key encrypting keys are used to encrypt/decrypt other keys. The operational key of importance to this invention is the system session key (KS). This key is a system generated, time variant, dynamically created key transmitted in encrypted form under a key encrypting key from a first host system to a remote terminal or remote host system. The key is decrypted at the remote terminal or remote host and loaded into a working key register. The key exists only for the duration of the communication session.

The key encrypting keys of importance to this invention are the terminal master key (KMT) and the cross-domain key (KCD). The terminal master key is used to protect the system session key at the remote terminal or remote host. The cross-domain key is used to protect the system session key transmitted from the host system in one domain to the host system in another domain of a multiple domain communication network.

Further details concerning the use, verification and implementation of operational and key encrypting keys can be found in U.S. Pat. No. 4,227,253 to Ehrsam et al and U.S. Pat. No. 4,193,131 to Lennon et al, both of which are assigned to the same assignee as the present application, and which are hereby incorporated by reference.

Figure 4:
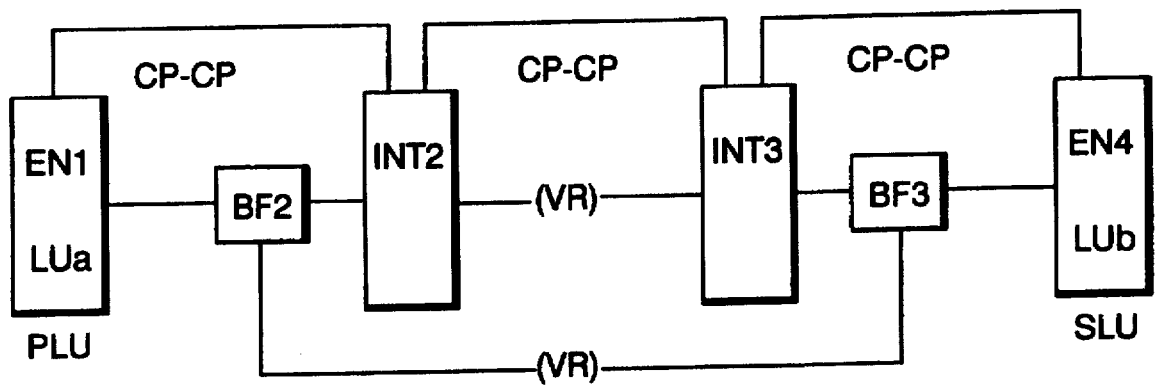
FIG. 4 is a flow diagram of the cryptography session initiation process in which the present invention is implemented.
Figure 4:
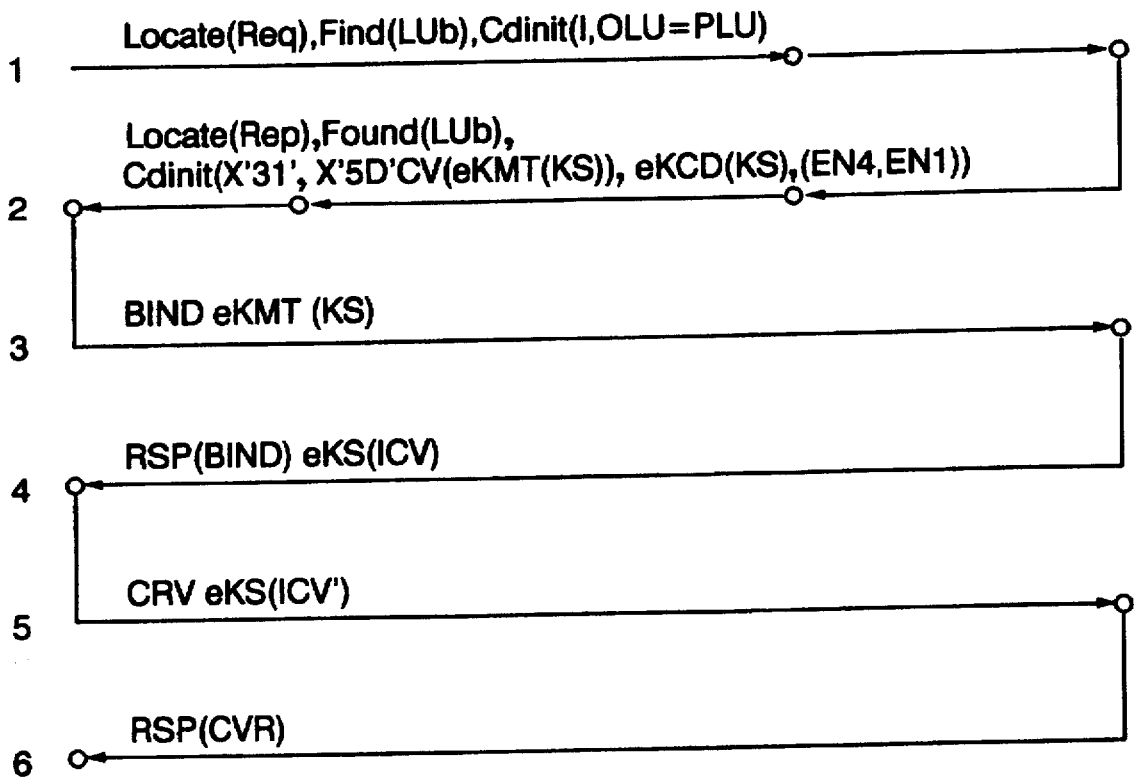

FIG. 4 depicts the initiation of a cryptographic session in an SNA environment between a logical unit in EN1 and a logical unit in EN4. Six time-sequential message flows are illustrated. For this description, they will be referred to simply as message flows one through six.

In message flow one, a LOCATE-CDINIT request message is sent from EN1 to EN4 to establish a session between logical unit LUa, a host application in EN1 and logical unit LUb, a host application in EN4. The originating logical unit (OLU) is LUa which for session establishment is referred to as the primary logical unit (PLU). The destination logical unit LUb is referred to as the secondary logical unit (SLU).

In message flow two, a LOCATE-CDINIT reply from EN4 is received at EN1. The reply includes cryptography information when LUb is cryptographic capable. Cryptography options are included in the BIND image (X'31') control vector in bytes 26–27 of the BIND image. The session cyrptography key (KS) is encrypted under the SLU master key (KMT) and included in the BIND image control vector in bytes 28-k of the BIND image. The BIND image in the CDINIT reply message sent by the SLU represents the suggested parameters for the BIND request message. Also included in the CDINIT reply in control vector X'63' is the session cryptography key (KS) encrypted under the "send" cross-domain key (KCD) for EN1, and the control point name pair (EN4, EN1). The notation eKMT (KS) and eKCD (KS) used in the CDINIT reply means that the session key (KS) is encrypted using the SLU master key KMT, and that the session key is encrypted using the cross-domain key (KCD), respectively. The notation X'31' and X'63' in the CDINIT reply represents control vector identifiers expressed as hexadecimal numbers.

When EN1 receives the LOCATE-CDINIT reply, it acquires the session cryptography key to be used at the PLU end by decrypting the key included in the CDINIT GDS variable using the "receive" cross-domain key for EN4. The session cryptography key encrypted under the host master key is saved by EN1. Next, in message flow three, the BIND request is sent by LU2 and includes the session key encrypted under the SLU master key that was in the BIND image (i.e., the X'31' control vector) in message flow two.

In the next step in the session establishment process, the SLU decrypts the session cryptography key (KS) and generates an 8-byte initial chaining value (ICV) which is a random number "seed" value that is put in the BIND response. The ICV is encrypted under the session cyrptography key (KS) as indicated in message flow four which is the BIND response sent by the SLU to the PLU.

LUa uses the session cryptography key to decrypt the initial chaining value. To determine that the PLU is using the correct session cyrptography key, LUa inverts the first 4 bytes of the ICV and enciphers the values under the session cyrptography key, eKS (ICV'), which is sent to the SLU in the cyrptography verification (CRV) request as represented by message flow five.

The SLU decrypts the value in the CRV request using the session cyrptography key, inverts the first four bytes, and compares this value with the initial chaining value that had been generated and saved by the SLU previously. If the values are the same, then the SLU is certain that the PLU is using the same session cyrptography key. As indicated in message flow six, the SLU sends a positive CRV response. However, with the message flows as described, the PLU is not certain that the SLU possesses the correct session key. Thus, without authentication of the SLU, there is no way to guarantee prevention of loss of sensitive data caused by sending it to a partner node that does not possess the proper key for decrypting the data.

The problem of SLU authentication is solved as described below without the need for any additional message flows between the PLU and SLU. The steps performed by the PLU and SLU that are associated with the first two message flows remain the same. When EN1 receives the LOCATE-CDINIT reply in message flow two, the PLU saves the low order half of the encrypted session key, i.e., the low order four bytes of eKMT(KS). As before, upon receipt of the BIND request from the PLU (message flow three), LUb obtains from the BIND request the session key encrypted under the master key of the SLU (i.e., eKMT(KS)). The SLU saves the low order half (4 bytes) of the encrypted key and then concatenates those four bytes to four bytes of pseudorandom data to form a new initial chaining value. The result is encrypted using the session cryptography key and placed in the BIND response message flow. Upon receiving the BIND response, LUa uses the session cryptography key to decrypt the new initial chaining value. After decrypting the new initial chain value, the PLU compares the low order half (4 bytes) of the decrypted ICV to the low order four bytes of the encrypted session cyrptography key that was previously saved. If the values are equal, session set up continues. If the values are not equal, session set up is terminated. In the former situation this means inverting the first four bytes of the new ICV, encrypting the result, and transmitting the CVR request by the PLU (message flow five). As before, the SLU decrypts the modified new initial chaining value in the CRV using the session cyrptography key, inverts the first four bytes, and compares this value with the new initial chaining value it had generated earlier. If the values are the same, then both the PLU and SLU are using the same session cryptography key. The SLU sends a positive CRV response to complete the session initiation process.

While the invention has been particularly shown and described with reference to the particular embodiment hereof, it will be understood by those skilled in the art that various changes in form and details may be made therein without departing from the spirit and scope of the invention.

Having thus described our invention, what we claim and desire to secure as Letters Patent is as follows:

1. In a data communication network having a plurality of network nodes and providing data security for a communication session between a sending network node and a receiving network node wherein each network node has cryptographic apparatus for encrypting and decrypting communication keys, a method for authenticating the receiving network node during session initiation comprising the steps of:

sending a session initiation request from the sending network node to the receiving network node;

generating a session key and encrypting said session key under a master encrypting key at the receiving network node;

sending a session initiation reply from said receiving network node to said sending network node containing the encrypted session key;

upon receiving the session initiation reply, decrypting the session key at the sending network node and saving a first selected portion of the encrypted session key;

sending a session set-up message from the sending network node to the receiving network node, said session set-up message containing the encrypted session key;

upon receiving the session set-up request at the receiving network node, decrypting the session key and concatenating a second selected portion of the encrypted session key with a pseudorandom portion to obtain an initial chaining value which is encrypted using the session key;

sending a session set-up response from the receiving network node to the sending network node containing the encrypted initial chaining value;

decrypting the initial chaining value at the sending network node and comparing the second selected portion in the initial chaining value with the first selected portion of the encrypted session key to verify that the receiving network node has a correct session key.

2. The method for authenticating the receiving network node of claim 1 including the steps of:

if in the comparing step, the first selected portion of the encrypted session key is the same as the second selected portion in the initial chaining value, then sending a cryptography verification request from the sending network node to the receiving network node; and if in the comparing step, the first selected portion of the encrypted session key is not the same as the second selected portion in the initial chaining value, then terminating session initiation.

3. The method for authenticating the receiving network node of claim 2 further including the steps of:

inverting the pseudorandom portion in the initial chaining value at the sending network node to form a modified initial chaining value that is encrypted using the session key and placed in the cryptography verification request;

encrypted the modified initial chaining value in said cryptography verification request at the receiving network node to obtain the modified initial chaining value;

inverting a third selected portion in the modified initial chaining value at the receiving network node and comparing said inverted third selected portion in the modified initial chaining value with said pseudorandom portion in the initial chaining value to verify that the sending network node has the correct session key; and if said receiving network node verifies that the sending network node has the correct session key, then sending a cryptography verification response from the receiving network node to the sending network node acknowledging that the sending network node has the correct session key.

4. The method for authenticating the receiving network node of claim 3 wherein said third selected portion contains the high order four bytes of the modified initial chaining value encrypted in said cryptography verification request at the receiving node.

5. The method for authenticating the receiving network node of claim 1 wherein said first selected portion contains the low order four bytes of the encrypted session key received at said sending network node.

6. The method for authenticating the receiving network node of claim 1 wherein said second selected portion of the initial chaining value contains the low order four bytes of the encrypted session key received at the receiving node.

7. The method for authenticating the receiving network node of claim 1 wherein said pseudorandom portion is generated at said receiving network node and placed in the high order four bytes of the initial chaining value.

8. In a data communication network having a plurality of network nodes and providing data security for a communication session between a sending network node and a receiving network node wherein each network node has cryptographic apparatus for encrypting and decrypting communication keys, a system for authenticating the receiving network node during session initiation comprising:

means at the receiving network node, responsive to the receipt of a session initiation request from the sending network node, for generating a session key and encrypting said session key under a master encrypting key;

means at the sending network node, responsive to the receipt of a session initiation reply containing the encrypted session key, for decrypting the session key and saving a first selected portion of the encrypted session key;

means at the receiving network node, responsive to the receipt of a session set-up message containing the encrypted session key, for decrypting the session key and concatenating a second selected portion of the encrypted session key with a pseudorandom portion to obtain an initial chaining value which is encrypted using the session key;

means at the sending network node, responsive to the receipt of a session set-up response containing the encrypted initial chaining value, for decrypting the initial chaining value and comparing the second selected portion in the initial chaining value with the first selected portion of the encrypted session key to verify that the receiving network node has a correct session key.

9. The system for authenticating the receiving network node of claim 8 further including:

means at the sending network node, cooperative with said comparing means, for inverting the pseudorandom portion in the initial chaining value and forming a modified initial chaining value that is encrypted using the session key and placed in a cryptography verification request;

means at the receiving network node, responsive to the receipt of said cryptography verification request, for decrypting the modified initial chaining value in said cryptography verification request to obtain the modified initial chaining value; and means at the receiving network node, for inverting a third selected portion in the modified initial chaining value and comparing said inverted third selected portion in the modified initial chaining value with said pseudorandom portion in the initial chaining value to verify that the sending network node has the correct session key.

10. The system for authenticating the receiving network node of claim 9 wherein said third selected portion contains the high order four bytes of the modified initial chaining value decrypted in said cryptography verification request at the receiving network node.

11. The system for authenticating the receiving network node of claim 8 wherein said first selected portion contains the low order four bytes of the encrypted session key received at said sending network node.

12. The system for authenticating the receiving network node of claim 8 wherein said second selected portion of the initial chaining value contains the low order four bytes of the encrypted session key received at the receiving network node.

13. The system for authenticating the receiving network node of claim 8 wherein said pseudorandom portion is generated at said receiving network node and placed in the high order four bytes of the initial chaining value.

* * * * *